INVENTOR
LAWRENCE L. GORDON
BY Philip S. McLean
ATTORNEY

Patented Oct. 21, 1952 2,615,088

UNITED STATES PATENT OFFICE 2,615,088

SUPERVISORY CONTROL SYSTEM FOR FILMING TELEVISION AND OTHER PICTURES

Lawrence L. Gordon, New York, N. Y.

Application January 5, 1951, Serial No. 204,560

2 Claims. (Cl. 178—6)

Figures 1, 2:
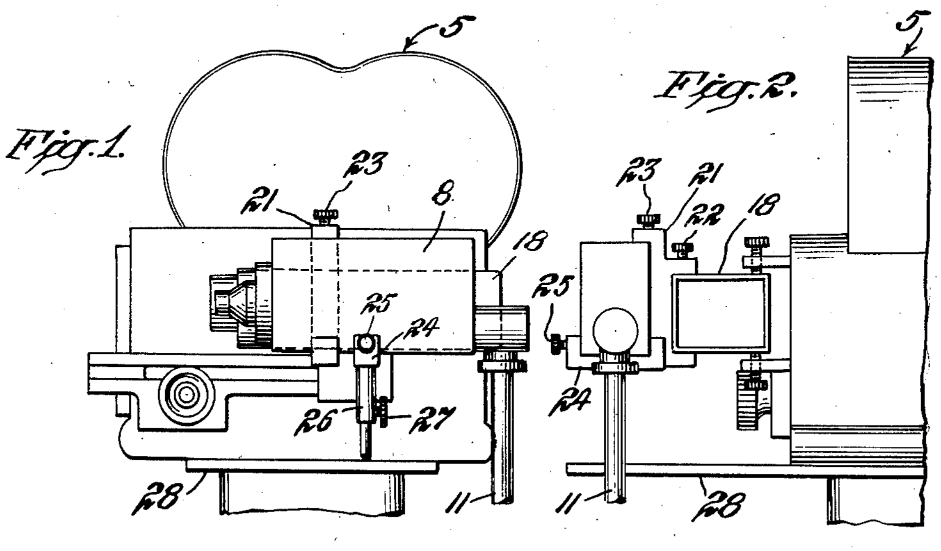

The invention herein disclosed relates to the filming of television and motion picture productions generally.

Objects of the invention are to provide a practical method of supervising and controlling the action of the different cameras ordinarily employed in taking such pictures and to provide equipment for the purpose which can be correlated with the cameras and other apparatus now used and which, further, will be reasonable in cost, for the results accomplished.

Other desirable results attained by the invention are set forth and will appear in the course of the following specification wherein the novel features of the invention are described and claimed.

The drawing accompanying and forming part of the specification illustrates a present practical embodiment of the invention and its method of application, but it will be appreciated, as the invention is understood, that actual structure and operations may be modified and changed in various ways, all within the broad intent and scope of the invention as hereinafter defined.

Fig. 1 in the drawing is a side elevation of a motion picture camera, modified in accordance with the invention by having a television camera attached thereto in true parallax and synchronized relation;

Fig. 2 is a broken, rear view of the moving picture camera showing the television camera attached to the view finder of the film camera.

In both the views mentioned the tripod head or supporting base is indicated as broken away and, similarly, the camera cable which transmits the picture signals from the video camera to the monitor at the director's control panel, is indicated broken away.

Figure 3:
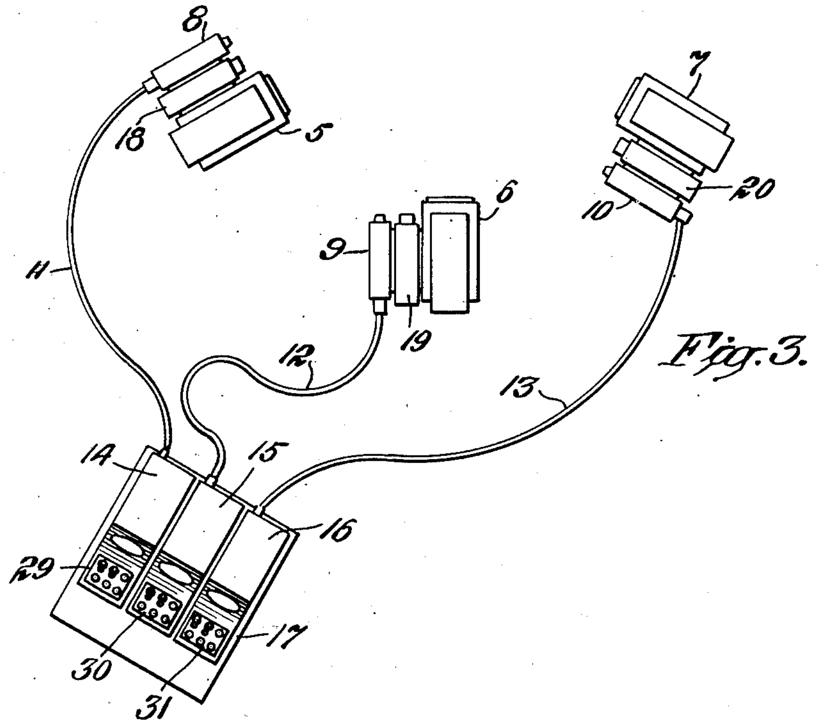

Fig. 3 is a plan view, diagrammatic in character, illustrating a group of three cameras linked to the monitoring control set at the director's desk.

Briefly considered, the invention involves equipping each film camera, such as those indicated at 5, 6 and 7, in Fig. 3, with a parallax television camera 8, 9, 10, operating in synchronism with the camera to which it is related and connected by transmission cable 11, 12, 13, with television monitor receivers 14, 15, 16, on the director's console table or like support 17.

The film cameras may be of standard design, mounted for universal adjustment and equipped with conventional view finders 18, 19, 20.

View finders such as shown, located at the side of the camera, provide a convenient and practical means for the mounting of the television camera to pick up the scene being photographed by the film camera.

In the illustration this is accomplished by providing a special bracket 21 which is clamped at the inside over the view finder at 22 and clamps at the outside over the television camera at 23.

This double clamping bracket provides a quick and easy means of mounting and attaching the television camera to the view finder of the motion picture camera.

To support the weight of the television camera in the outstanding or overhanging relation shown, and particularly to carry the superimposed load of the transmission cable hanging from such camera, a bracket 24 is shown clamped at 25 to the underside of the television camera, carrying a dependent post 26 telescopically adjustable at 27 for riding over the shelf or table 28 extending out from the base of the moving picture camera.

The television camera, synchronized with and carried by each moving picture camera, sees the scene being pictured by that camera, and through the camera cable and television receiver at the director's panel, pictures that view to the director so that he can see at all times, practically without changing his position, just what each is visualizing.

The director, through an intercommunication system with each cameraman and an automatic camera change-over system with each film camera, is in control to direct operations and to make cuts from one camera to another.

In making these change-overs, the film cameras may be automatically turned on or cut off from the monitor board, from which point a mark may be signalized on the film to identify the splicing points for editing purposes. This so-called synchronization mark may be simply a light "bloop" printed on the film by pushing a button at the console when the cameras are running synchronously at sound speed.

With this method the director can supervise and control any number of film cameras, selecting and coordinating pictured results and controlling for closeups, long shots, multiple angle shots and allowing for breaks, retakes, scene and costume changes and the like.

Through this immediacy and directiveness of control much time in the arranging and taking of pictures is saved, waste of time, services and materials is avoided and better and more artistic results are achieved. The cost of additional equipment for the results achieved is moderate, and running expenses are no greater as operation of the system as to visualization of the pick-up of each camera is entirely automatic.

While of special value for planning and arranging plays for television programs, it will be realized that the invention is of advantage to motion picture filming operations generally.

The monitor panel with the necessary communication and control connections may be located in a control booth or any other convenient place. The intercommunication connections and necessary controls are not shown in detail, since these may vary as circumstances require. For purposes of disclosure, however, such controls are indicated in a general way at 29, 30, 31, Fig. 3, for the three cameras shown.

The films taken by the synchronized, simultaneously running moving picture cameras may be projected simultaneously on screens for comparison, enabling the editor and director to inspect all film and line it up on a gang synchronizer and edit down to a single film.

What is claimed is:

1. In a system of the character disclosed, a motion picture camera, a television camera, means for supporting said television camera in parallax relation on said motion picture camera, a television monitor and a camera transmission cable connection from said television camera to said monitor, said mounting means including a bracket for clamping said television camera to the moving picture camera and a leg for movably supporting the weight of said television camera and the cable connection extending therefrom.

2. In a system of the character disclosed, a motion picture camera, a television camera, means for supporting said television camera in parallax relation on said motion picture camera, a television monitor and a camera transmission cable connection from said television camera to said monitor, said mounting means including a bracket for clamping said television camera to the moving picture camera, a leg for movably supporting the weight of said television camera and the cable connection extending therefrom, and a supporting shelf for said leg carried by said moving picture camera.

LAWRENCE L. GORDON.

REFERENCES CITED

The following references are of record in the file of this patent:

UNITED STATES PATENTS

| Number | Name | Date |
|---|---|---|
| 2,183,217 | Goldsmith | Dec. 12, 1939 |
| 2,347,933 | Campbell | May 2, 1944 |
| 2,384,232 | Beers | Sept. 4, 1945 |
| 2,420,197 | Rosenthal | May 6, 1947 |
| 2,516,069 | Newhouse | July 18, 1950 |

FOREIGN PATENTS

| Number | Country | Date |
|---|---|---|
| 504,750 | Great Britain | May 1, 1939 |